US006502159B1

(12) United States Patent
Chuang et al.

(10) Patent No.: US 6,502,159 B1
(45) Date of Patent: Dec. 31, 2002

(54) METHOD AND APPARATUS FOR INCREASING DATA THROUGHPUT IN A COMPUTER SYSTEM

(75) Inventors: Te-Chih Chuang, MiaoLi (TW); Hsueh-Wei Huang, Taipei (TW); Hsi-Yuan Hsu, Hsindian (TW)

(73) Assignees: Acer Incorporated (TW); Acer Laboratories Inc. (TW)

( * ) Notice: Subject to any disclaimer, the term of this patent is extended or adjusted under 35 U.S.C. 154(b) by 140 days.

(21) Appl. No.: 09/608,578

(22) Filed: Jun. 30, 2000

Related U.S. Application Data

(63) Continuation of application No. 08/813,529, filed on Mar. 7, 1997, now abandoned.
(60) Provisional application No. 60/020,004, filed on Jun. 21, 1996, and provisional application No. 60/026,321, filed on Sep. 16, 1996.

(51) Int. Cl.[7] .......................... G06F 13/00; G06F 13/38
(52) U.S. Cl. .......................... 710/316; 710/27; 710/38
(58) Field of Search .............................. 710/305–317, 710/28, 27

(56) References Cited

U.S. PATENT DOCUMENTS

| 4,697,232 A | * | 9/1987 | Brunelle et al. ............... 710/46 |
| 5,420,988 A | * | 5/1995 | Elliott .......................... 712/300 |
| 5,630,174 A | * | 5/1997 | Stone et al. ................. 345/520 |
| 5,682,484 A | | 10/1997 | Lambreact ................... 395/308 |
| 5,692,211 A | | 11/1997 | Gulick et al. ............... 395/800 |
| 5,907,686 A | | 5/1999 | Zenda ......................... 395/282 |

* cited by examiner

*Primary Examiner*—Rupal Dharia
(74) *Attorney, Agent, or Firm*—Townsend and Townsend and Crew LLP; David N. Slone

(57) ABSTRACT

Techniques for improving overall data throughput in a computer system, especially during the playing of movies from CD-ROMs provides for a direct flow of data between the CD-ROM and the MPEG card, greatly reducing system memory usage and bus utilization. Control circuitry is responsive to signals from the CPU, which signals specify whether data from the CD-ROM can be sent directly to the MPEG decoder circuit or needs to be sent over the buses to the system memory. Accordingly, different transmission paths are used, depending on the attribute and destination of the data in order to reduce unnecessary data flow in the system and unnecessary consumption of system resources.

5 Claims, 3 Drawing Sheets

METHOD AND APPARATUS FOR INCREASING DATA THROUGHPUT IN A COMPUTER SYSTEM

CROSS-REFERENCE TO RELATED APPLICATIONS

This application is a continuation of U.S. application Ser. No. 08/813,529, filed Mar. 7, 1997, now abandoned which claims priority from U.S. Provisional Application No. 60/020,004, filed Jun. 21, 1996 and U.S. Provisional Application No. 60/026,321, filed Sep. 16, 1996.

BACKGROUND OF THE INVENTION

The present invention relates generally to computer systems, and more specifically to techniques for increasing data throughput in such systems.

In conventional systems, data transfers are generally under the control of the CPU, and data flow can be between the CPU and system memory, between the CPU and persistent data storage devices, between the data storage devices and the system memory, and between the CPU and peripheral devices. In addition to requiring CPU cycles, such data transfers also occupy the buses that connect the various devices. As the power of CPUs has increased, the data flow needs in the computer system also have increased. In general, however, the techniques for efficiently moving data among the various devices in the system have not kept pace with the huge increases in CPU power.

In modern multitasking operating systems, the computer system executes different programs concurrently. However, with many different processes competing both for CPU resources and bus bandwidth, any bottlenecks have the effect of slowing the entire system. These problems are especially evident in modern computers which include multimedia capabilities. In recognition of the fact that there is in general a mismatch in the relative speeds and demands of various devices in the system, multiple-level bus systems have been developed.

FIG. 1 shows a schematic of a conventional personal computer system 10 utilizing a three-bus system in which a CPU 12 communicates with other system resources. The buses are arranged in a hierarchy based on speed and width. In a typical PC-compatible system, the CPU communicates with a memory subsystem and various I/O (peripheral) devices. The nature of these devices is well known, but will be described briefly.

The CPU communicates with a memory subsystem (including system memory 15 and second-level cache memory 17) on a system bus 20, also referred to as a host bus or a local bus, while one or more peripheral buses are used for other devices. In a modern system, the system bus is a 64-bit bus that operates at 66 MHz.

In the specific architecture shown in FIG. 1, the peripherals are coupled to one or the other of a fast peripheral bus 25, such as a PCI bus, or a slow peripheral bus 30. The slow peripheral bus is typically an industry standard expansion bus such as an ISA bus, an EISA bus, or an MCA bus. The industry standard expansion bus is often referred to herein as a legacy bus, since its primary purpose is to be compatible with past generations of 8-bit and 16-bit peripheral devices whose functions are such that they can still perform adequately in a modern system. In particular, the PCI bus is coupled to the system bus through a host/PCI bridge 32, while the PCI bus is coupled to the legacy bus through a PCI/legacy bridge 35. In an alternative configuration, the legacy bus is coupled to the system bus through a host/legacy bridge 37. This latter configuration is suggested by having host/legacy bridge 37 shown in phantom. In a typical implementation, host/PCI bridge 32 is part of a chipset that also incorporates system logic such as a memory controller for system memory 15.

As a general matter, the PCI bus includes PCI bus resources (a PCI bus master, PCI target memory, and PCI target I/O), while the legacy bus includes legacy bus resources (a legacy bus master, legacy memory, and legacy I/O). The choice of which peripherals go on which bus is determined in part by cost and speed considerations. In general, PCI bus peripherals are faster and wider versions of the same types of peripherals that can be coupled to the legacy bus. For example, PCI bus 25 is a 32-bit bus that operates at 33 MHz while an ISA bus is a 16-bit bus that operates at 8 MHz.

In the specific embodiment illustrated, the devices coupled to PCI bus 25 include a display controller 40, such as a VGA controller or super VGA controller, and an enhanced IDE controller 45. There are a number of interface standards for peripherals, the most common of which are IDE (Integrated Device Electronics) and SCSI (Small Computer System Interface). These interfaces receive commands from the CPU, and control the operation of the connected peripheral devices. An IDE interface controller, such as a Model M5215 chip from Acer Laboratories, controls up to two disk drives at once. The enhanced IDE interface standard provides for faster data transfers and controls up to four disk drives at once.

Enhanced IDE interface controller 45 includes primary and secondary IDE interface controllers, and in this embodiment communicates with a hard disk drive 47 and a CD-ROM drive 48.

The legacy bus devices include a super I/O controller 50, which is interfaced to a floppy disk drive 52, and an MPEG card 57, which is interfaced to a display device 60 such as a CRT monitor or the like. Also coupled to the legacy bus are peripherals such as a network interface card 65 (which may be an Ethernet® card) and a sound card 67. Also shown schematically connected to legacy bus 30 are a ROM BIOS 75, a printer 77, a keyboard 80, a pointing device 82 (which may be a mouse, trackball, or similar device), and a scanner 85. It should be understood that coupling of some of these latter devices is shown schematically since they may be coupled to alternative ports and derived buses.

Display controller 40 is coupled to MPEG card 57 by a feature connector 90 in order that the display controller and MPEG controller can coordinate to drive the display. The feature connector is a cable that provides signals, including the DAC signals, to the MPEG card. In other embodiments control signals could be communicated over the bus.

Consider a conventional technique for displaying data stored on a CD in CD-ROM drive 48 on display device 60. The following sequence of steps illustrate the process:

1. CPU 12 executes the CD-ROM driver and MPEG driver programs, which both reside in system memory 15.
2. CPU 12 issues a PLAY command to enhanced IDE controller 45.
3. In response to the PLAY command issued by CPU 12, enhanced IDE controller 45 issues a corresponding PLAY command to CD-ROM controller 48.
4. In response to the PLAY command, CD-ROM controller 48 reads CD-ROM data into its CD-ROM controller buffer.

5. Enhanced IDE controller 45 reads data from the CD-ROM controller buffer into its enhanced IDE controller buffer.
6. Host/PCI bridge 32 reads the data from the enhanced IDE controller buffer into its Host/PCI bridge buffer via PCI bus 7.
7. Host/PCI bridge 32 reads data from the Host/PCI bridge buffer and transfers it to CPU 12 via system bus 20.
8. Host/PCI bridge 32 reads data from CPU 12 into system memory 15 via system bus 20.
9. Host/PCI bridge 32 reads data from system memory 15 into CPU 12 via system bus 20.
10. Host/PCI bridge 32 reads data from CPU 12 into the Host/PCI bridge buffer via system bus 20.
11. Host/PCI bridge 32 reads data from the Host/PCI bridge buffer and transfers it to the PCI/Legacy bridge's buffer via PCI bus 25.
12. PCI/Legacy bridge 35 transfers data from the PCI/Legacy bridge buffer into the MPEG card's buffer via legacy bus 30.
13. MPEG card 57 decompresses the data and outputs accordingly to display device 60, incorporating the signals from display controller 40.

The data flow is shown schematically in Table 1.

While this type of data transfer may not present a major problem for some types of data, consider the case where the CD-ROM is used for playing a movie clip. The large amount of data to be processed and transferred represents a major load on the system. For example, for a 320×200 24-bit color picture, the size is about 187.5 KB (320*200*24÷8) for but a single frame. A movie needs to play 30 frames per second, which would result in a file of size 5.5 MB for one second's playing, or 330 MB for one minute's playing, or 30 GB for 90 minutes' playing. If high fidelity is required, the data size will even increase. The MPEG card provides compression according to the MPEG standard to solve this problem, but even if the compression technique could achieve a perfect compression rate of 1:30, there will still be 1 GB data for 90 minutes playing. Thus, during the playing of the movie, the flow of data moving back and forth between the system and peripherals via the buses would place a great strain on the system resources.

SUMMARY OF THE INVENTION

The present invention provides techniques for improving overall data throughput in a computer system, especially during the playing of movies from CD-ROMs.

In short, the present invention recognizes and exploits the fact that a large portion of the data transfer described above is unnecessary. By a relatively small reconfiguration of the computer system, the invention provides for a direct flow of data between the CD-ROM and the MPEG card, greatly reducing system memory usage and bus utilization.

In a specific embodiment, control circuitry is responsive to signals from the CPU, which signals specify whether data from the CD-ROM can be sent directly to the MPEG decoder circuit or needs to be sent over the buses to the system memory. Accordingly, the invention provides different transmission paths depending on the attribute and destination of the data in order to reduce unnecessary data flow in the system and unnecessary consumption of system resources.

A further understanding of the nature and advantages of the invention may be realized by reference to remaining portions of the specification and drawings.

DESCRIPTION OF SPECIFIC EMBODIMENTS

System Overview

Figure 1:
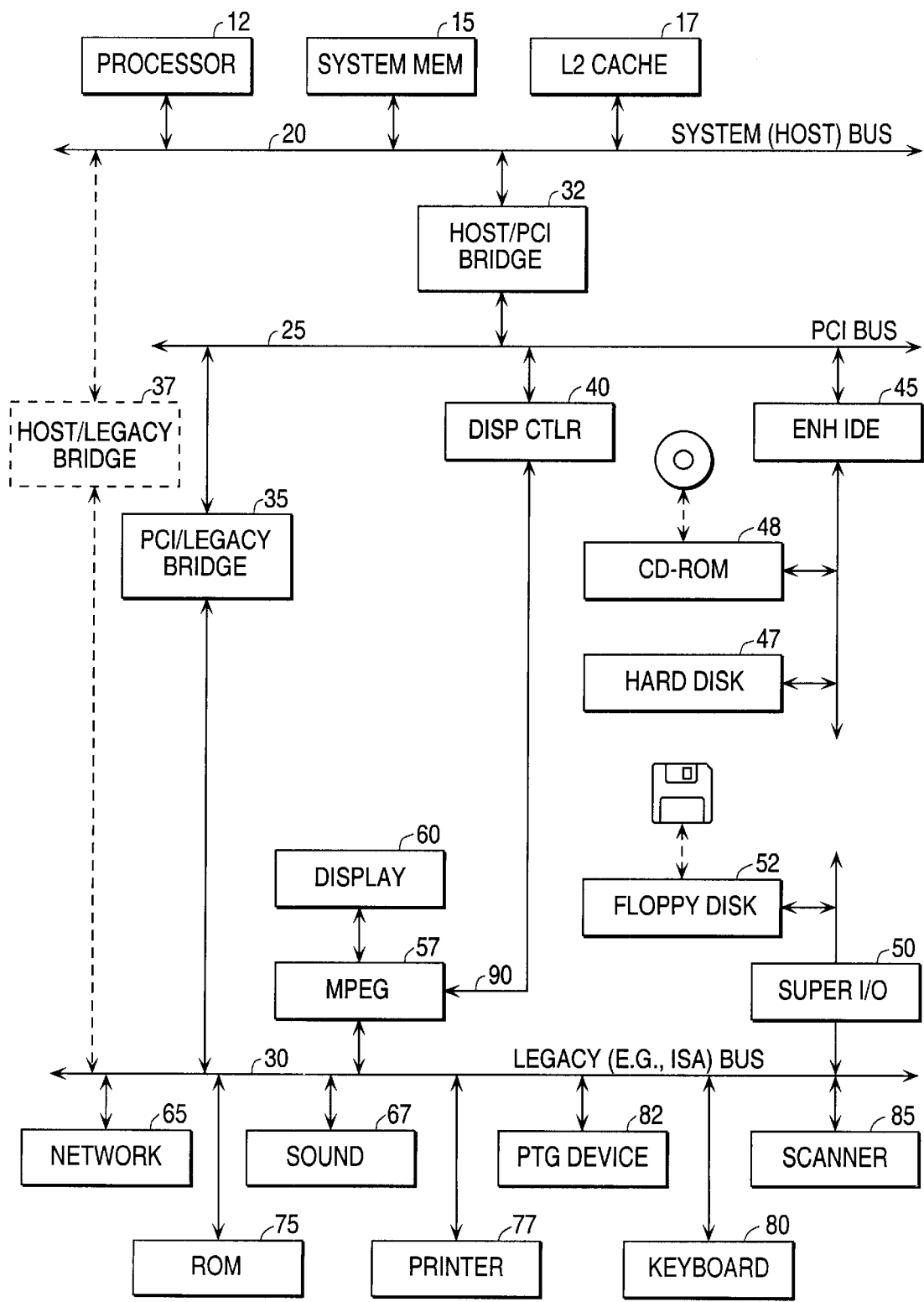
FIG. 1 is a block diagram of a conventional computer system incorporating an MPEG card and a CD-ROM.
Figure 2:
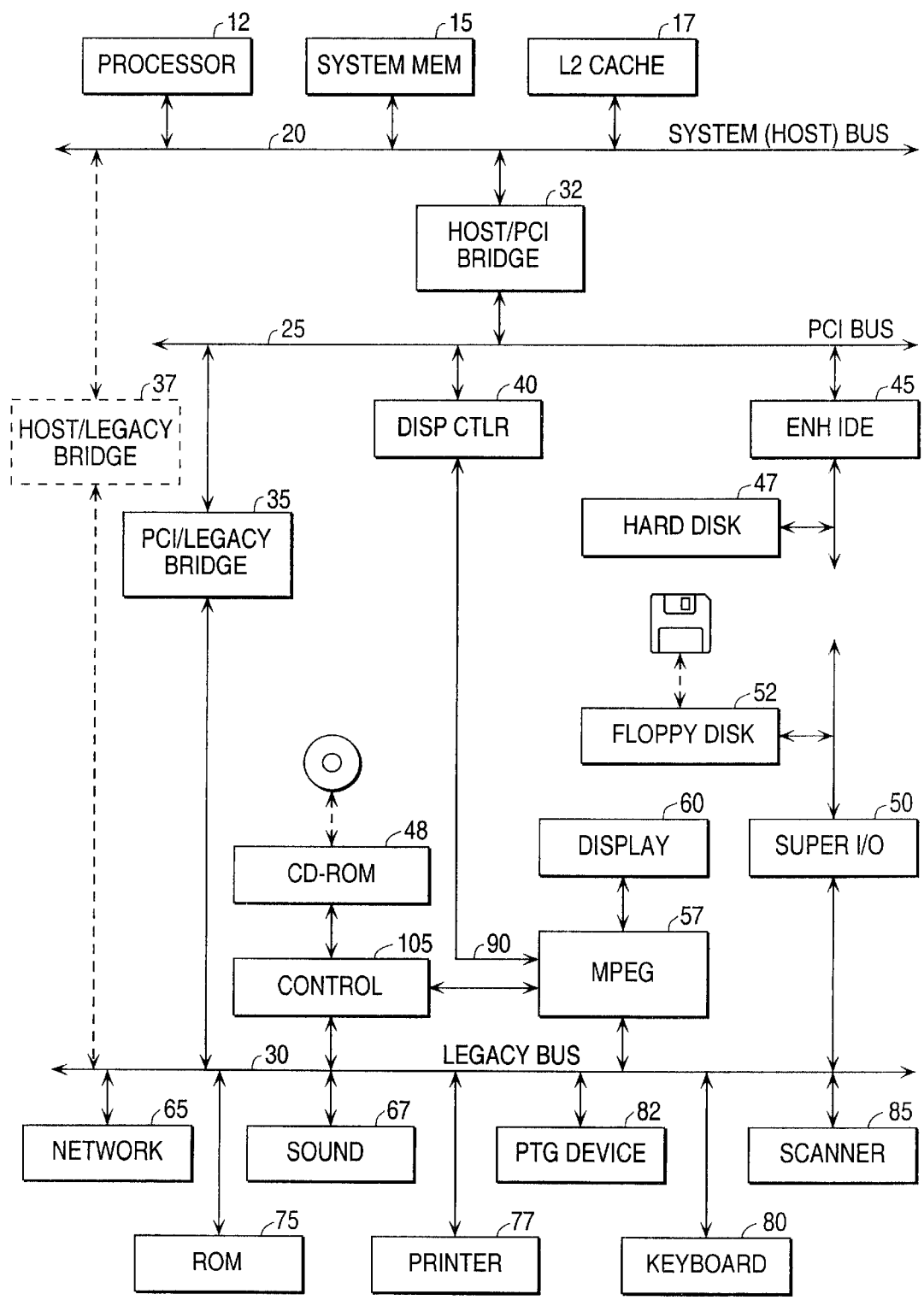
FIG. 2 is a block diagram of a computer system in a specific embodiment of the present invention.

FIG. 2 shows a schematic of a personal computer system 100 representing an embodiment of the present invention. The invention is shown as implemented in a system such as system 10 of FIG. 1, and corresponding reference numerals will be used for corresponding elements.

The embodiment differs from the traditional system in that it includes an additional control circuit 105 associated with MPEG card 57, and CD-ROM drive 48 is connected to this control circuit. In short, control circuit 105 provides selectable first and second paths for CD-ROM data. The first path is a conventional path where the CD-ROM data is read out and communicated over the buses to system memory 15. The second path is a bypass path that, when appropriate, communicates the CD-ROM data directly to MPEG card 57 for decompression and display without the data having to travel on the buses or be stored in system memory 15. Accordingly, when the CD-ROM drive is playing movies, which only need to be processed by the MPEG decoder and sent directly to the monitor, control circuit 105 is able to keep the data off the buses, thereby making those scarce resources available to other processes running in the system.

Specific Implementations

Figure 3:
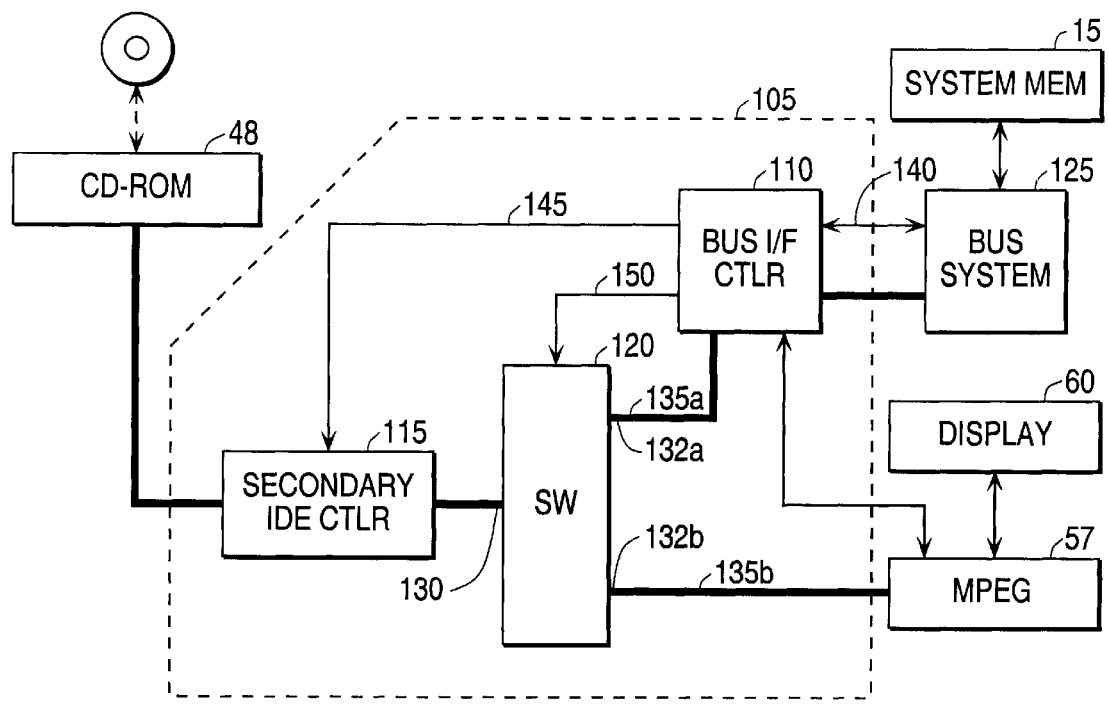
FIG. 3 is a functional block diagram of the control circuit in a preferred embodiment of the present invention.

FIG. 3 is a block diagram of control circuit 105 and relevant portions of the system. The figure further shows some of the control signals for establishing the data paths. The control circuit comprises a bus interface controller 110, a secondary IDE interface controller 115, and a data switch 120. The bus system is designated by a block 125. CD-ROM drive 48 is coupled to, and is controlled by, secondary IDE interface controller 115, which couples the CD-ROM output data path to an input 130 of data switch 120. The data switch has two outputs, 132a and 132b. Bus interface controller 110 is coupled to legacy bus 30, and establishes the first data path, designated 135a, from the first switch output, through bus interface controller 110, to the bus. The second switch output is coupled to MPEG card 57 to establish the second data path, designated 135b.

Bus interface controller 110 receives signals from the bus, including address, data, and control signals, which indicate the destination of the data read from CD-ROM drive 48. In response to a system command over a signal line 140, bus interface controller 110 decodes the command and generates a command on a signal line 145 controlling secondary interface controller 115, specifying reading data from CD-ROM drive 48. Depending on the nature of the command received from the system, bus interface controller 110 controls data switch 120 by issuing the appropriate signal on a signal line 150. This establishes whether the data from the CD-ROM is directed along the first path, ultimately transmitting it to the system memory, or the second path, transmitting it directly to the MPEG card.

Figure 4:
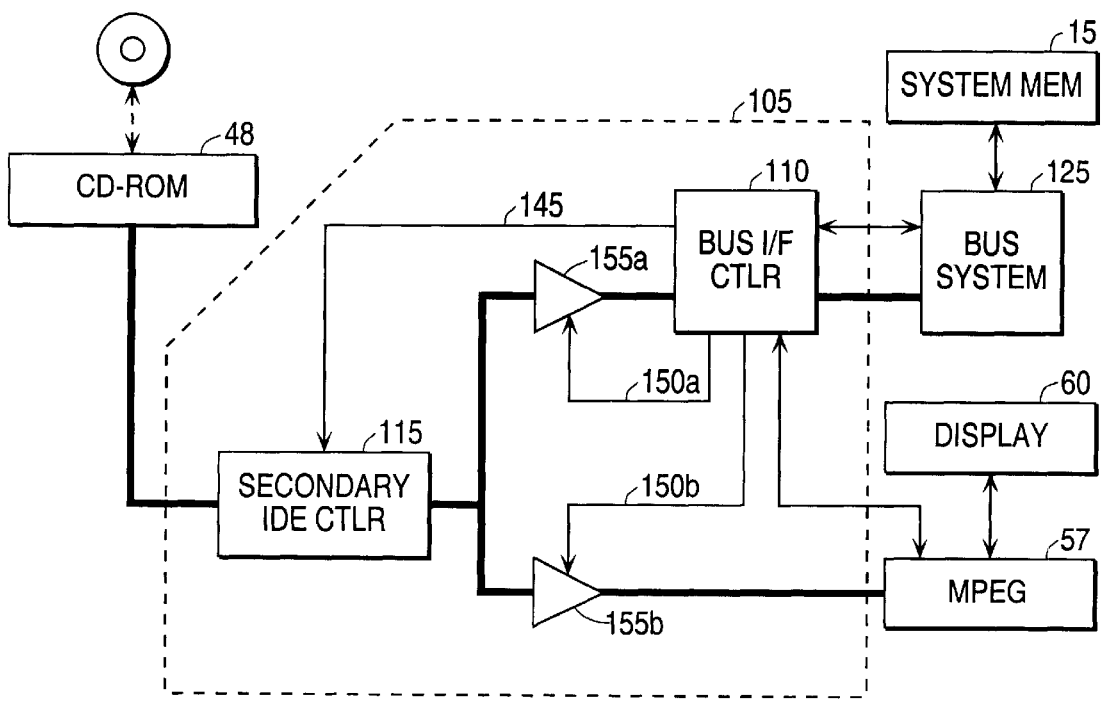
FIG. 4 is a more detailed diagram of the control circuit in a preferred embodiment of the present invention.

FIG. 4 is a more detailed block diagram showing a specific implementation of control circuit 105. In this embodiment, the data switch is implemented with two tri-state logic gates 155a and 155b, each having a width corresponding to that of legacy bus 30. The first tri-state gate establishes a data path to bus interface controller 110, while the second has an output coupled to MPEG card 57. The tri-state gates have output enable terminals that receive output enable signals on a pair of signal lines 150a and 150b, collectively corresponding to signal line 150 in FIG. 3. The output enable signals are normally mutually exclusive so that only one of the two paths will be established.

It is preferred to integrate control circuit 105 into a single chip with the MPEG decoder in MPEG card 57. In order that the secondary IDE interface controller in the control circuit not conflict with the secondary IDE controller in enhanced IDE controller 45, the driver program is modified so that during bootup of the system, the driver will disable the secondary IDE interface controller in enhanced IDE controller 45.

Operation of the Invention

If the nature of the command is for the CPU to access the CD-ROM data, the following operations are performed 1. CPU 12 executes the CD-ROM driver and IDE interface controller driver programs, which both reside in system memory 15.
2. CPU 12 issues a READ command to control circuit 105.
3. In response to the READ command issued by CPU 12, control circuit 105 issues a corresponding READ command to CD-ROM controller 48.
4. In response to the READ command, CD-ROM controller 48 reads CD-ROM data into its CD-ROM controller buffer.
5. Control circuit 105 reads the data from the CD-ROM controller buffer to the control circuit's buffer.
6. PCI/Legacy bridge 35 reads the data from the control circuit's buffer into the PCI/Legacy bridge buffer via legacy bus 30.
7. Host/PCI bridge 32 reads the data from the PCI/Legacy bridge's buffer and transfers it to the Host/PCI bridge buffer via PCI bus 25.
8. Host/PCI bridge 32 reads the data from its Host/PCI bridge buffer and transfers it to CPU 12 via system bus 20.
9. CPU 12 writes data to system memory 15 via system bus 20.
10. CPU 12 reads data from system memory 15 into CPU 12 via system bus 20.

The data flow is generally as shown in Table 1, with modifications due to the fact the CD-ROM drive is now on the legacy bus rather than the PCI bus.

On the other hand, when the computer system is to play a movie using the CD-ROM, there is no need for the data to travel on the buses to system memory 15, and the following operations are performed:

1. CPU 12 executes the CD-ROM driver, the IDE interface controller driver, and the MPEG driver programs, which reside in system memory 15.
2. CPU 12 issues a PLAY command to control circuit 105.
3. In response to the PLAY command issued by CPU 12, control circuit 105 issues a corresponding PLAY command to CD-ROM controller 48.
4. In response to the PLAY command, CD-ROM controller 48 reads CD-ROM data into its CD-ROM controller buffer.
5. Control circuit 105 reads the data from the CD-ROM controller buffer into the MPEG card's buffer.
6. MPEG card 57 decompresses the data and outputs accordingly to display device 60 incorporated with the signals from display controller 40.

The data flow is shown schematically in Table 2.

Performance Benefits of the Invention

In order to simplify the comparison of the operation efficiency of a conventional computer system and the preferred embodiment of the present invention in the context of CD-ROM playing, the following assumptions will be made:

1. There is no wait during the data transmission on ISA bus.
2. Overhead, such as arbitration time, is negligible during data transmission on ISA bus.
3. The buffer of the IDE interface controller is big enough that the low speed of CD-ROM operation does not reduce the performance of data transmission on bus.
4. The ISA bus uses three cycles to process a 16-bit I/O access.
5. The operation frequency of the ISA bus is 8 MHz.
6. The amount of data is much larger than that of the command, so the time for the command can be neglected.

With the above assumptions, the data flow on the ISA bus during the playing of CD-ROM and the access time of CPU occupied by the playing of CD-ROM can be compared.

According to the MPEG 1 standard, the data throughput for 30 frames per second will be 200 KB/sec. For MPEG 2 standard, it will be 2 MB/sec. Thus, in a conventional computer system following MPEG 1 standard, the data flow on the ISA bus will be 200 KB/sec for the data traveling from the CD-ROM to the Host/PCI bridge controller's buffer, and the data flow on system bus 20 will be 400 KB/sec. For data traveling from the system memory to MPEG 1 decoder, there will be another 400 MB/sec on system bus 20 and 200 MB/sec on ISA bus 30. By the same token, for a system following MPEG 2 standard, there will be 2 MB/sec on ISA bus 30 and 4 MB/sec on system bus 20 for the data traveling from the CD-ROM to the system memory, and another 4 MB/sec on system bus 20 and 2 MB/sec on the ISA bus for data traveling from the system memory to the MPEG 2 decoder.

However, in the preferred embodiment of the present invention, the data transmission does not take the path via the ISA bus and the system bus. Thus, the data flow on the ISA bus and system bus is nearly zero besides the command. Assuming that command is 1 byte, it will be the only data flow on ISA bus and system bus. Thus, during the playing of a CD-ROM in an MPEG 1 system, the load on ISA bus is reduced by a factor of 400,000 and the load on the system bus is reduced. by a factor of 800,000. In a MPEG 2 system, the loads on the ISA and system buses are reduced by respective factors of 4,000,000 and 8,000,000.

Since the operation frequency of the ISA bus is 8 MHz, each cycle is 125 ns. Because the ISA bus uses three cycles to process a 16-bit (2-byte) I/O access, every I/O access takes 125*3=375 ns. If the CPU is an Intel DX2-66 CPU operating at 66 MHz, the period is 15 ns. Thus, the time it takes for the bus to process a 2-byte data item corresponds to 375/15=25 CPU cycles. During the playing of a CD-ROM movie in a conventional computer system, there are 400 KB/sec to be processed by the CPU, which takes up 400 KB at 25 cycles per 2-byte item, for a total of 5M cycles/sec that could be put to productive use on other concurrently executing processes.

However, in a computer system of the preferred embodiment, the CPU is not occupied by the I/O access of the ISA bus except for issuing commands. Assuming that the command will occupy the whole reading cycle, which is 4 cycles, that would be the only CPU cycles that will be occupied. Conservatively estimated, the occupation of CPU working cycle will reduced by a factor of 5M/4=1.25M for MPEG 1, and a factor of 50M/4=12.5M for MPEG 2.

Conclusion

In conclusion, it can be seen that the present invention provides an elegant solution to major data throughput bottlenecks in computer systems. The invention requires minor modifications of existing circuits, and so can be implemented at minimal cost.

While the above is a complete description of preferred embodiments of the invention, various modifications, alternative constructions, and equivalents may be used while remaining within the scope of the invention. For example, while the specific embodiments use IDE interface controllers, SCSI controllers could also be implemented. Also, as noted above, the legacy bus can be coupled directly to system bus through host legacy bridge 37 as opposed to being coupled to PCI bus via PCI/legacy bridge 35. Additionally, while the invention is described in a specific embodiment where the alternative data path is a direct path from a CD-ROM drive to an MPEG card, the invention could also be used in other applications where some data transfers need to be sent on the bus to system memory, but others do not need to, and can thus be diverted off the bus. For example, the invention could be implemented to provide a bypass path between a hard disk drive and a network card to allow uploading and downloading large files without imposing on system resources.

Therefore, the above description and illustrations should not be construed as limiting the scope of the invention which is defined by the following claims.

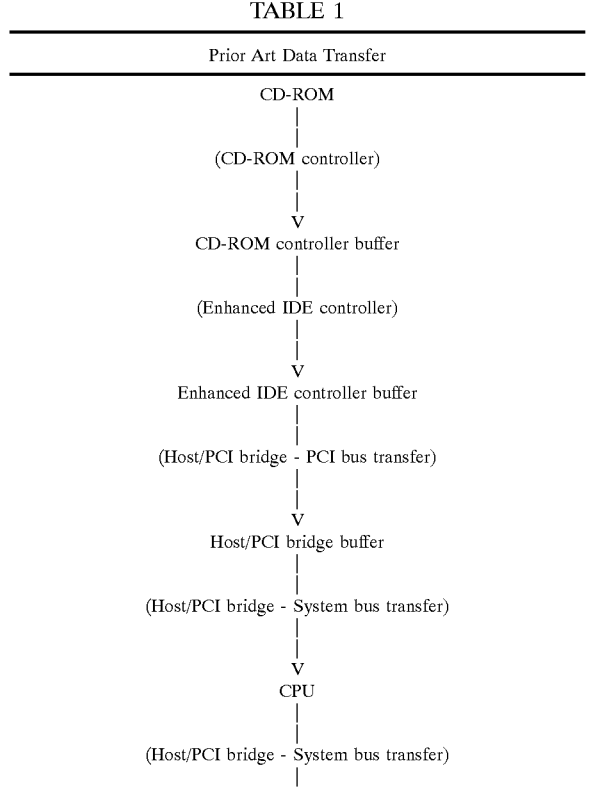

TABLE 1

Prior Art Data Transfer

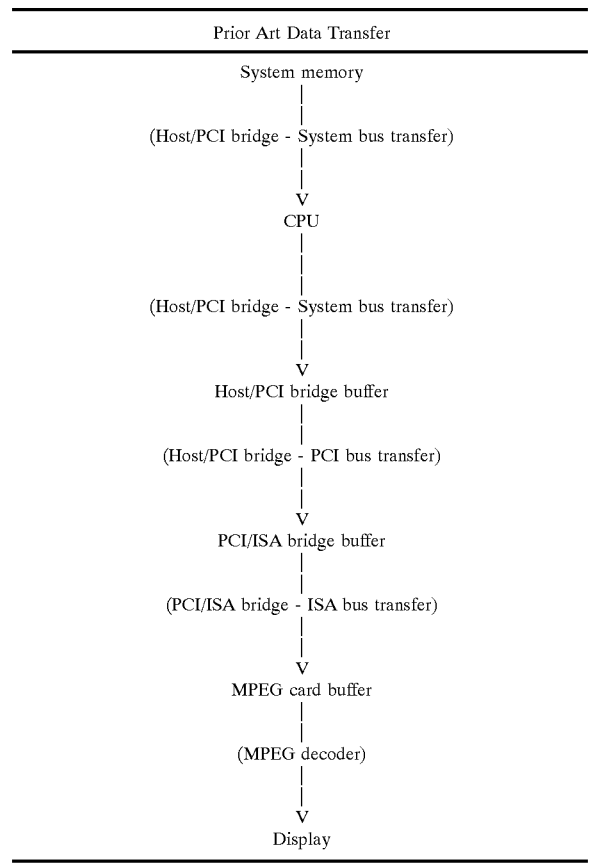

TABLE 1-continued

Prior Art Data Transfer

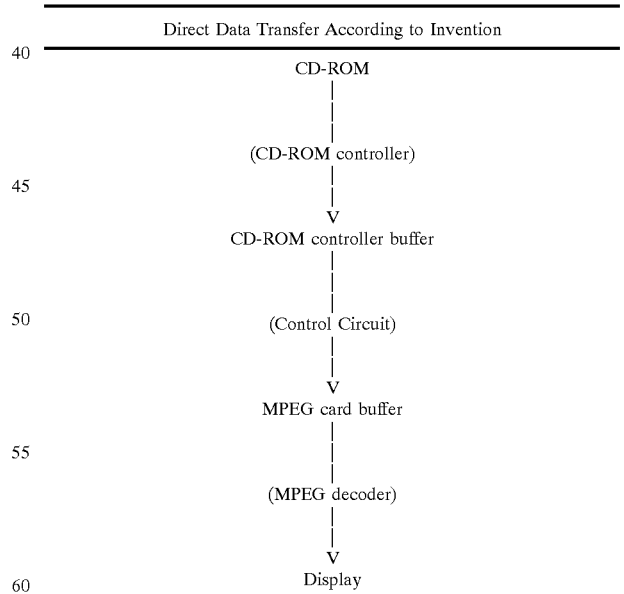

TABLE 2

Direct Data Transfer According to Invention

What is claimed is:

1. A computer system comprising:

a central processing unit for processing data and controlling the operation of said computer system;

a bus system for transmitting first data and second data thereon;

a system memory coupled to said central processing unit via said bus system for storing said first data in said computer system;

a control circuit electrically coupled to said central processing unit and said system memory via said bus system, said control circuit having means for receiving data from a data source and transmitting said first data via a first path or said second data via a second path in said computer system; and a decoder, coupled to said control circuit, for receiving and decoding said second data, said first path including said system memory, said second path exclusive of said system memory and said central processing unit.

2. The computer system of claim 1, wherein said control circuit comprises:

an interface controller; and a data switch electronically coupled to said data source, said interface controller, and said first and second paths, said interface controller generating a path control signal in response to the content of said data transfer control signal so as to control said data switch directing said data to said first path or said second path.

3. The computer system of claim 1, wherein said data source is a data storage device.

4. A computer system comprising:

a central processing unit for processing data and controlling the operation of said computer system, said central processing unit generating either a first output command or a second output command according to the characteristics of first data. or second data to be moved and the destination of said first data said second data;

a bus system for transmitting said first data and said second data thereon;

a system memory coupled to said central processing unit via said bus system for storing data in said computer system;

a decoder for decoding said second data; and a control circuit electrically coupled to said central processing unit, said decoder, and said system memory via said bus system and responsive to said first or second output commands, said control circuit receiving data from a data source and transmitting said first data along a first path to said system memory or to said central processing unit via said bus system, or transmitting said second data along a second path to said decoder, said second data path exclusive of said system memory and said central processing unit.

5. A method for transferring data in a computer system, the computer system comprising a central processing unit, a system memory, a bus system, and a decoder, which are connected to each other via said bus system, the method comprising the steps of:

providing a data switch, said data switch having an input effective for being coupled to receive data from a data storage device and further having a first path to said system memory or said central processing unit and a second path exclusive of said system memory and said central processing unit, said second path effective for being directly coupled to said decoder then to a destination device;

generating a first or a second output command representing if the data to be moved needs to be processed by said central processing unit or not; and in response to said first or second command, operating said data switch to direct said data to be transmitted via one of said first path and said second path.

* * * * *